US006204302B1

(12) United States Patent
Rawls et al.

(10) Patent No.: US 6,204,302 B1
(45) Date of Patent: Mar. 20, 2001

(54) PHOTOSENSITIZERS FOR FREE RADICAL POLYMERIZATION INITIATION RESINS AND METHOD OF MAKING THE SAME

(75) Inventors: H. Ralph Rawls, San Antonio, TX (US); Yeong-Joon Park; Kyu-Ho Chae, both of Kwangju (KR)

(73) Assignee: Bisco, Inc., Schaumburg, IL (US)

( * ) Notice: Subject to any disclaimer, the term of this patent is extended or adjusted under 35 U.S.C. 154(b) by 0 days.

(21) Appl. No.: 09/444,476

(22) Filed: Nov. 19, 1999

Related U.S. Application Data
(60) Provisional application No. 60/109,407, filed on Nov. 20, 1998.

(51) Int. Cl.[7] .................................. C08F 2/48; C08F 2/50

(52) U.S. Cl. ................................. 522/8; 522/37; 522/36; 522/10; 522/33; 522/48; 522/908; 522/182; 522/120; 522/121; 523/109; 523/115; 523/116; 523/300; 523/118

(58) Field of Search ................................... 522/10, 33, 8, 522/36, 37, 48, 908, 182, 120, 122; 523/109, 116, 118, 115, 300

(56) References Cited

U.S. PATENT DOCUMENTS

| | | |
|---|---|---|
| Re. 35,135 | * 12/1995 | Sakashita et al. ...................... 522/14 |
| 3,998,712 | 12/1976 | Hickmann et al. ............. 204/159.15 |
| 4,038,350 | 7/1977 | Jaques ................................... 264/22 |
| 4,089,762 | 5/1978 | Frodsham ........................ 204/159.15 |
| 4,351,853 | 9/1982 | Jochum et al. ........................... 427/2 |
| 4,352,753 | 10/1982 | Uchikawa et al. ................ 428/304.4 |
| 4,457,818 | 7/1984 | Denyer et al. .................. 204/159.15 |
| 4,464,457 | * 8/1984 | Bosse et al. .......................... 430/288 |
| 4,522,694 | 6/1985 | Schaefer ........................... 204/159.24 |
| 4,525,256 | 6/1985 | Martin ............................. 204/159.18 |
| 4,619,681 | * 10/1986 | Wingen et al. ....................... 430/260 |
| 4,777,190 | 10/1988 | Sasaki et al. .......................... 522/17 |
| 4,826,888 | 5/1989 | Sasaki et al. .......................... 522/26 |
| 4,933,376 | * 6/1990 | Sasaki et al. .......................... 522/14 |
| 4,968,725 | * 11/1990 | Mukai et al. ........................... 522/90 |
| 5,008,300 | * 4/1991 | Makino et al. .......................... 522/8 |
| 5,063,255 | * 11/1991 | Hagegawa et al. ..................... 522/96 |
| 5,066,564 | * 11/1991 | Zertani et al. ....................... 430/284 |
| 5,192,815 | * 3/1993 | Okada et al. ......................... 523/115 |
| 5,277,739 | * 1/1994 | Muller et al. ...................... 156/330.9 |
| 5,321,053 | * 6/1994 | Hino et al. ............................. 522/26 |
| 5,472,991 | 12/1995 | Schmitt et al. .......................... 522/4 |
| 5,486,544 | * 1/1996 | Kawashima et al. ................... 522/17 |
| 6,051,626 | * 4/2000 | Zeng et al. ........................... 523/118 |

OTHER PUBLICATIONS

J.M. Antonucci et al., *Tertiary Amine Salts and Complexes as Chemical and Photochemical Accelerators*, J. Dent. Res., vol. 66, No. 170, Abstract 128 (1987).

K.H. Chae et al., *Phenylproanedione: A New Visible Light Photosensitizer for Dental Composite Resin With Higher Efficiency Than Comphorquinone*, Bull. Korean Chem. Soc'y, vol. 19, No. 2, pp. 152–154 (1998).

S.G. Cohen et al., *Photoreduction of Aromatic Ketones by Amine: Studies of Quantum Yields and Mechanism*, J. Am. Chem. Soc., vol. 90, No.1, pp. 165–173 (1968).

W.D. Cook, *Special Distribution of Dental Photopolymerization Sources*, J. Dent. Res., vol. 61, No. 2, pp. 1436–1438 (1982).

J.L. Ferracane et al., *The Effect of Resin Formulation on the Degree of Conversion and Mechanical Properties of Dental Restorative Resins*, J. Biomed. Mater. Res., vol. 20, No. 1, pp. 121–131 (1986).

J.L. Ferracane et al., *Wear and Marginal Breakdown of Composites with Various Degrees of Cure*, J. Dent. Res., vol. 76, No. 8, pp. 1508–1516 (1997).

J.P. Fouassier, *An Introduction to the Basic Principals in UV Curing In: Radiation Curing in Polymer Science and Technology*, vol. 1, Ch. 2, pp. 49–117 (1993).

L.R. Gatechair et al., *Depth of Cure Profiling of UV–Cured Coatings*, Poly. Mat. Sci. Eng., vol. 60, pp. 17–21 (1989).

G.P. Gladyshev et al., *Polymer Synthesis. VI. Polymerization of Methyl Methacrylate Activated by Photooxidation in the Presence of Sensitizers*. Vysokomolekul Soadin, vol. 4, pp. 1345–1350 (1962).

J. Guthrie et al., *Light Screening Effects of Photoinitiators in UV Curable Systems*, Poly. Bull., vol. 15, No. 1, pp. 51–58 (1986).

J. Hutchison et al., *Photo–initiation of Vinyl Polymarization by Aromatic Carbonyl Compounds*, Adv. Poly. Sci., vol. 14, pp. 49–86 (1974).

H. Inano et al., *Photochemical Inactivation of Human Placental Estradiol 17 β–Dehydrogenase in the Presence of 2, 3–Butandione*, J. Steroid. Biochem., vol. 19, No. 5, pp. 1617–1622 (1983).

Y. Kadoma et al., *Visible–light Initiator System Using Thiobarbituric Acid Derivatives with Methyl Substituent*, Shika Zairyo Kikai, vol. 9, No.5, Abstract of pp. 747–753 (1990).

M. Kubo, *Visible–light Cured Resin. Selection of Reducing Agent Amine, its Appropriate Amount and Effect on Physical Properties*, Shika Zairyo Kikai, vol. 8, No. 3, Abstract of pp. 349–363 (1989).

(List continued on next page.)

Primary Examiner—James J. Seidleck
Assistant Examiner—Sanza L. McClendon
(74) Attorney, Agent, or Firm—Marshall, O'Toole, Gerstein, Murray & Borun

(57) ABSTRACT

A photoinitiator composition that includes (a) 1-aryl-2-alkyl-1,2-ethanedione and (b) a rigid 1,2-dione in a weight ratio of (a):(b) in a range of about 1:20 to about 20:1 is disclosed. The photoinitiator composition can be used in a photocurable dental composition in an amount sufficient to achieve a degree of double-bond conversion of at least 50%. Methods for making the photocurable dental composition are also disclosed.

30 Claims, 9 Drawing Sheets

OTHER PUBLICATIONS

A. Ledwith, *Photoinitiation of Polymerization*, Pure and Appl. Chem., vol. 49, pp. 431–441 (1977).

L.A. Linden, *Photocuring of Polymeric Dental Materials and Plastic Composite Resins*, Radiation Curing in Polymer Science and Technology, vol. 1, Ch. 13, pp. 387–466 (1993).

K.K. Mäkinen et al.,*Oxidation, Photosensitized by Certain Diketones, of Enzymes and Protection Against Such Oxidation by Histidine Derivatives*Bioscience Reports, vol. 2, No. 3, pp. 169–175 (1982).

T. Nikaido, *Formulation of Photocurable Bonding Liner and Adhesion to Dentin: Effect of Photoiniator Monomer and Photoirradiation*, Shika Zairyo Kikai, vol. 8, No. 6, pp. 862–876 (1989).

G. Oster, *Dye Sensitized Photopolymerization*, Nature, vol. 173, pp. 300–301 (1954).

G. Oster, *Photoreduction of Synthetic Dyes*, J. Chem. Phys., vol. 55, p. 899–904 (1958).

G. Oster et al., *Dye Sensitized Photooxidation*, J. Am. Chem. Soc., vol. 81, pp. 5095–5099 (1959).

G. Oster, *Photopolymerization of Vinyl Monomers*, Chem. Rev., vol. 68, pp. 125–151 (1968).

Y.J. Park et al., *Development of a New Photoinitiation System for Dental Light–Cure Composite Resins*, Dent. Mat., vol. 15, p. 120–127 (1998).

A. Peutzfeldt, *Quantity of Remaining Double Bonds of Diacetyl–containing Resins*, J. Dent Res., vol. 73, No. 2, pp. 511–515 (1994).

A. Peutzfeldt, *Quantity of Remaining Double Bonds of Propanal–containing Resins*, J. Des. Res., vol. 73, No. 10, pp. 1657–1662 (1994).

A. Peutzfeldt et al., *Influence of Ketones on Selected Mechanical Properties of Resin Composites*, J. Dent. Res., vol. 71, No. 11, pp. 1847–1850 (1992).

A. Peutzfeldt et al., *Katones in Resin Composites–effect of Ketone Content and Monomer Composition on Selected Mechanical Properties*, E. Acta. Odontol. Scand., vol. 50, pp. 253–258 (1992).

A. Peutzfeldt et al.,*In Vitro Wear, Hardness, and Conversion of Diacetyl–Containing and Propanal–containing Resin Materials*, Den. Mat., vol. 12, No. 2, pp. 103–108 (1996).

A. Peutzfeldt et al., *Effect of Propanal and Diacetyl on Quantity of Remaining Dobule Bonds of Chemically Cured BisGMA/REGDMA Resins, European J. Oral Sciences*, vol. 104, No. 3, pp. 309–312 (1996).

R. Puppala et al., *Laser and Light Cured Composite Resin Restorations: In–vitro Comparison of Isotope and Dye Penetrations*, J. Clin. Pediatric. Dent., vol. 20, No. 3, pp. 213–218 (1996).

R.L. Rietschel, *Contact Allergens in Ultraviolet–cured Acrylic Resin Systems*, Occupational Medicine, vol. 1, No. 2, pp. 301–306 (1986).

I.E. Ruyter et al., *An Infrared Spectroscopic Study of Sealants*, Scand. J. Dent. Res., vol. 84, pp. 396–400 (1976).

M. Taira et al., *Analysis of Photo–initiators in Visible–light–cured Dental Composite Resins*, J. Dent. Res., vol. 67, No. 1, pp. 24–28 (1988).

Z. Tarle, et al., *Polymerization of Composites Using Pulsed Laser*, Eur. J. Oral Sci., vol. 103, pp. 394–398 (1995).

K. Yoshida et al., *Effects of Two Amine Reducing Agents on the Degree of Conversion and Physical Properties of an Unfilled Light–Cured Resin*, Dent. Mat., vol. 9, pp. 246–251 (1993).

* cited by examiner

PHOTOSENSITIZERS FOR FREE RADICAL POLYMERIZATION INITIATION RESINS AND METHOD OF MAKING THE SAME

CROSS REFERENCE TO RELATED APPLICATION

This application claims the benefit under 35 U.S.C. § 119(e) of U.S. provisional patent application Ser. No. 60/109,407 filed Nov. 20, 1998, the disclosure of which is hereby incorporated herein by reference.

BACKGROUND OF THE INVENTION

1. Field of the Invention

The invention generally relates to whiter photoinitiated dental resins and composites, and to methods for making same. More specifically, the invention relates to light-cure dental compositions including at least one photopolymerizable monomer and a photoinitiation system including (a) a 1-aryl-2-alkyl-1,2-ethanedione and (b) a rigid 1,2-dione in a weight ratio of (a):(b) in a range of about 1:20 to about 20:1, wherein the mixture is present in an amount sufficient to achieve a degree of double-bond conversion (DC) of at least 50%.

2. Brief Description of Related Technology

There is a consensus that improved conversion of double bonds during photopolymerization is critical for the optimization of mechanical properties (Ferracane and Greener, 1986; Ferracane et al., 1997; Peutzfeldt and Asmussen, 1996, 1992), biocompatibility (Rietschel, 1986), and color stability (Imazato et al., 1995) of light-activated dental resins. Photopolymerization implies both the light-induced increase of molecular weight by monomer to polymer conversion, as well as crosslinking of developing or preexisting macromolecules.

Photopolymerization reactions commonly are initiated by free-radicals formed by photosensitizers (also referred to hereinafter as photoinitiators). These photosensitizers typically posses a carbonyl group having a non-bonding electron capable of being promoted into the $\pi^*$ anti-bonding orbital by absorption of light of the quantum mechanically allowed wavelength. This electron promotion leads to production of a pair of free radicals, either by intramolecular cleavage (e.g., as with benzoin ethers such as benzoin methyl ether) or by proton abstraction from a labile site (e.g., an α-alkylamine group on amines such as N,N-dimethylamino ethylmethacrylate) with photosensitizers such as camphorquinone (CQ). Generally, photoinitiators should absorb and photoinitiate polymerization reactions in the visible light spectrum, such as at a wavelength of about 470 namometers (nm) for CQ.

Proton abstraction can be made highly efficient by formation of a complex between the photoexcited sensitizer and an electron-donating (reducing) agent, such as a tertiary amine. The complex is referred to as an "exciplex." Proton abstraction occurs within this exciplex which then breaks down to form free radicals (Oster and Yang, 1968; Hutchison and Ledwith, 1974; Ledwith, 1977). Aliphatic compounds containing two or more vicinal carbonyl groups have also been used as photosensitizers. Diacetyl, for example, absorbs in both the near-ultraviolet and blue regions of the spectrum (up to 467 nanometers (nm)) and has been used as a sensitizer for polymerization of methyl methacrylate with visible light (Gladyshev and Rafikov, 1962).

Even though a variety of compounds can act as initiators in the visible light region (Pummerer and Kehlen, 1933; Oster 1954, 1958; Oster et al., 1959; Fouassier, 1993), most investigations concerning dental resins have utilized CQ as a photosensitizer (Linden, 1993; Taira et al., 1988) in combination with a variety of reducing agents (Kubo, 1989; Nikaido, 1989; Kadoma and Imai, 1990; Yoshida and Greener, 1993). CQ is an alpha dicarbonyl that absorbs light having a wavelength of about 468 nm and, therefore, forms a very effective photoinitiator system when combined with an electron donor. However, CQ is inherently yellow, which causes problems in color matching. This, in turn, places practical limits on the concentration of CQ in a dental resin and, consequently, limits the degree of polymerization and depth of cure that can be attained. Efforts to improve the curing system have investigated the use of alternative photosensitizers (Peutzfeldt and Asmussen, 1992, 1992; Peutzfeldt, 1994, 1994; Peutzfeldt and Asmussen, 1996, 1996), alternative amines (Cohen and Chao, 1968; Antonucci and Venz, 1987), and alternative curing devices (Tarle et al., 1995; Puppala et al. 1996). Peutzfeldt and Asmussen (1996, 1996), seeking to increase crosslinking via additional components in the resin system, reported that diacetyl (2,3-butanedione) and propanal improved several properties in peroxide/amine initiated resins. Earlier, diacetyl had been reported to generate free radicals upon absorption of photons.

More recently, Makinen and Makinen (1982) and Inano et al. (1983) reported that several types of enzymes are photoxidized and inactivated in broad-spectrum visible light in the presence of a variety of alpha-dicarbonyl compounds such as 2,3-butanedione and 1-phenyl-1,2-propanedione. In visible light, 1-phenyl-1,2-propanedione inactivated enzymes more rapidly than the other diketones tested.

Thus, there is a need in the art for new photoinitiator systems for forming photo-cured dental resins which photopolymerize with higher efficiency and with less yellowing.

SUMMARY OF THE INVENTION

The invention provides a photoinitiator system for use in forming photo-cured dental resins comprising a mixture of (a) a 1-aryl-2-alkyl-1,2-ethanedione and (b) a rigid 1,2-dione in a weight ratio of (a):(b) in a range of about 1:20 to about 20:1.

The invention also provides a photocurable dental composition comprising at least one photopolymerizable monomer and a photoinitiator system comprising a mixture of(a) a l-aryl-2-alkyl-1,2-ethanedione and (b) a rigid 1,2-dione in a weight ratio of (a):(b) in a range of about 1:20 to about 20:1, wherein the mixture is present in an amount sufficient to achieve a degree of double-bond conversion (DC) of at least 50%.

The invention further provides a method of preparing resin systems suitable for use in restorative dentistry and other biomedical applications. The method includes combining at least one photopolymerizable monomer with a photoinitiator system comprising a mixture of (a) 1-aryl-2-alkyl-1,2-ethanedione and (b) a rigid 1,2-dione in a weight ratio of (a):(b) in a range of 1:20 to about 20:1, wherein the mixture is present in an amount sufficient to achieve a degree of double-bond conversion of at least 50%.

Further aspects and advantages of the invention may become apparent to those skilled in the art from a review of the following detailed description, taken in conjunction with the drawings, examples, and the appended claims. While the invention is susceptible of embodiments in various forms, described hereinafter are specific embodiments of the invention with the understanding that the present disclosure is intended as illustrative, and is not intended to limit the invention to the specific embodiments described herein.

BRIEF DESCRIPTION OF THE DRAWINGS

The invention can be better understood with reference to the following detailed description together with the appended illustrative drawings in which like elements are numbered the same.

Figure 1:
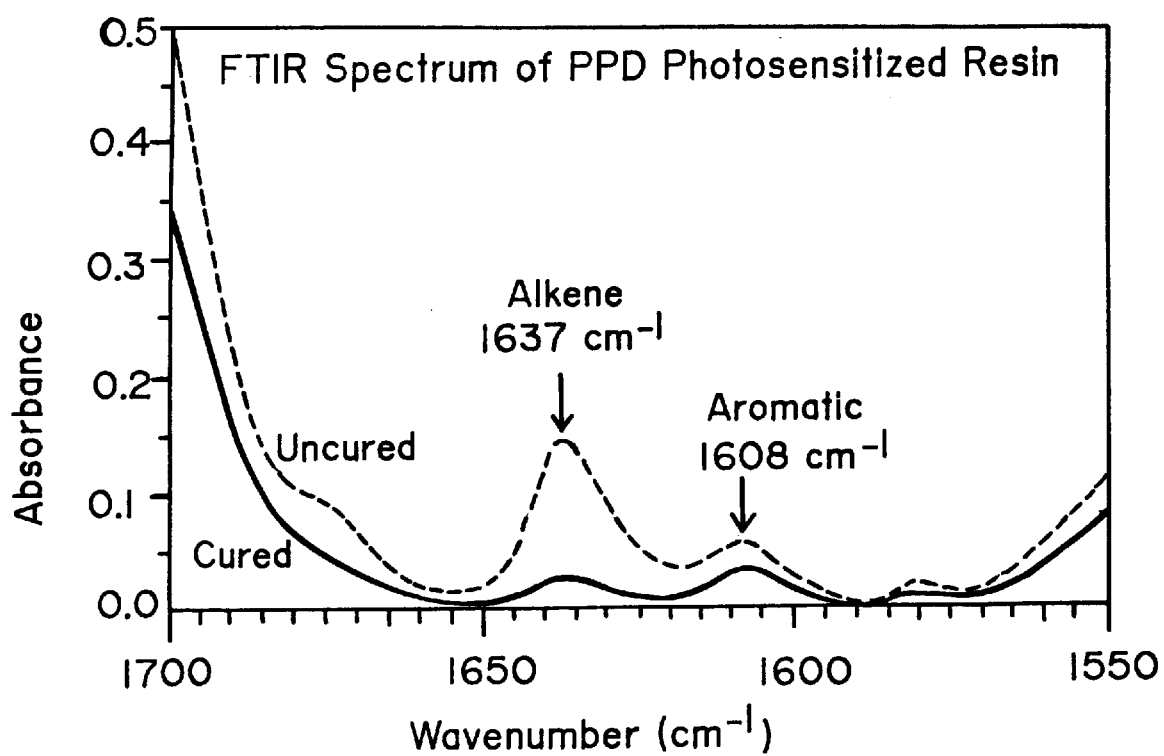
FIG. 1 depicts a characteristic FTIR spectrum of 1-phenyl-1,2-propandione (PPD) initiated resin before and after exposure to visible light (PPD/CQ=0.2/0.0 wt. % in monomer system, 8 minutes of exposure).

DETAILED DESCRIPTION OF THE PREFERRED EMBODIMENTS 1-phenyl-1,2-propanedione (PPD) has an aromatic group on one side of the dicarbonyl and a methyl group on the other. The inventors have discovered that PPD is a photosensitizer suitable for use with dental resins, with similar or better efficiency than CQ. This was verified experimentally (Park and Rawls, 1998; Chae and Sun, 1998), and the inventors also found that PPD appeared to act synergistically with CQ to increase monomer conversion to polymer. A study was then carried out to explore the synergistic effect as a means of developing an improved photopolymerization system.

The invention provides a photoinitiator system for use in forming photo-cured dental resins. The photoinitiator system includes a mixture of a 1-aryl-2-alkyl-1,2-ethanedione and a rigid 1,2-dione in a weight ratio of about 1:20 to about 20:1, preferably about 1:16 to about 16:1, more preferably about 1:8 to about 8:1.

The invention also provides a photo-cured dental composition which includes at least one monomer photopolymerizable by the aforementioned photoinitiator system which is present in an amount sufficient to achieve a degree of double-bond conversion (DC) of at least 50%, preferably at least 55%, and more preferably at least 60%.

In a preferred embodiment, the composition can also include a reducing agent, such as, for example, a dialkylarylamine, a tertiaryalkylamine, or a mixture thereof Suitable dialkylarylamines for use in the invention include, but are not limited to, N,N-cyanoethylmethylaniline (CEMA), N,N-dimethyl-paratoluidene, and mixtures thereof. Suitable tertiaryalkylamines for use in the invention include, but are not limited to, N,N-dimethylamino ethylmethacrylate, N,N-diethylamino ethylmethacrylate, and mixtures thereof.

The invention further provides a method of preparing resin systems suitable for use in restorative dentistry and other biomedical applications. The method includes combining at least one photopolymerizable monomer with a photoinitiator system comprising a mixture of 1-aryl-2-alkyl-1,2-ethanedione and a rigid 1,2-dione in a weight ratio of 1:20 to about 20:1 in an amount sufficient to achieve a degree of double-bond conversion of at least 50%, preferably at least 55%, and more at least 60%.

Suitable 1-aryl-2alkyl-1,2-ethanediones are characterized by compounds of formula:

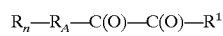

$$R_n-R_A-C(O)-C(O)-R^1$$

where $R_A$ is an aryl group such as phenyl, napthyl, anthracenyl, or the like; each R is the same or different and is a $C_1$ to $C_{20}$ hydrocarbyl group including, without limitation, alkyl, aryl, alkaryl, aralkyl or cycloalkyl groups, and n is an integer equal to the number of substitutable sites on the given aryl group, e.g., for phenyl, n is 5; for napthyl, n is 7; $R^1$ is a $C_1$ to $C_{12}$ alkyl group; and —C(O)—C(O) is an ethane dione group.

Suitable rigid 1,2-diones include, but are not limited to, bicyclo-[2.2.1]-heptane-diones such as CQ.

Suitable polymerizable monomers include, but are not limited to, vinyl esters, aromatic compounds and vinyl nitriles. Suitable vinyl esters include, but are not limited to, vinyl acetate and esters of acrylic acid having the structure $CH_2=CH-COOR$, where R is a $C_1$ to $C_{20}$ alkyl, aryl, alkaryl, aralkyl or cycloalkyl group such as methyl acrylate, ethyl acrylate, and isopropyl acrylates and n-, iso- and tertiary-butyl acrylates. Other polymerizable monomers are described in U.S. Pat. Nos. 3,998,712; 4,038,350; 4,089,762; 4,352,853; 4,522,694; 4,525,256; 4,777,190; 4,826,888; 5,472,991, and the respective disclosures of which are incorporated herein by reference.

Preferably the photopolymerizable monomer is a diacrylate, a triacrylate, or a mixture thereof Suitable diacrylates for use in the invention include, but are not limited to, 2,2-Bis-[4(2-hydroxy-3-mathacryloxy-propyloxy)phenyl]propane ("BisGMA"), 2,2-Bis-[4-(2-ethoxy-3-mathacryloxy-propyloxy)phenyl]propane ("BisEMA"), urethane dimethacrylate ("UDMA"), triethyleneglycol dimethacrylate ("TEGDMA"), ethylene glycol dimethacrylate ("EGDMA"), and mixtures thereof Suitable triacrylates for use in the invention include, but are not limited to, trimethylolpropane triacrylate, trimethylolpropane trimethacrylate, and mixtures thereof.

EXAMPLES

The following examples are provided to illustrate the invention but are not intended to limit the scope of the invention.

A BisGMA (30 mol %)-UDMA (40 mol %)-TEGDMA (30 mol %) monomer mixture was used for all resin formulations (Table 1). To make the materials light-curing, varying amounts of CQ and/or PPD were dissolved in the monomer mixtures along with N,N-cyanoethylmethylaniline as the reducing agent (0.2 wt. %/). All sample manipulations were carried out under filtered orange fight.

TABLE I

| Function | Compound | Batch number | Supplier |
| --- | --- | --- | --- |
| Resin | BisGMA | 73425 | Polyscience Inc. U.S.A. |
| Monomer | UDMA | 721079 | Ivoclar |
|  | TEGDMA | 295893 790 | Fluka Chemical Corp. |
| Photosensitizer | CQ | 06724AW | Aldrich Chem. Co. |
|  | PPD | 07911BR | Aldrich Chem. Co. |
| Reducing Agent | CEMA | 42407 | Pfaltz & Bauer, Inc. |

Seventeen groups, three specimens each, were tested in which PPD and CQ in the monomer system were each varied from 0.0 to 3.2 wt. % in the presence of the other, with the total CQ+PPD concentrations limited to 3.4 wt. %. Two factors were investigated for their effect on degree of conversion (DC): type of photosensitizer (CQ or PPD) and ratio of photosensitizers (PPD/CQ).

The DC was determined using an FTIR spetrophotometer (Midac Series M, Midac Co., Costa Mesa, Calif.). A small amount of the formulated resin monomer was placed between two potassium bromide (KBr) disks (zero seconds cure time) and scanned in the FTIR in the transmission mode, with 20 scans at a resolution of 1 wavenumber ($cm^{-1}$). After the IR spectral scan, the monomer mixture between the transparent KBr disks was irradiated for 20, 40, 60, 120, 240, and 480 seconds with an Optilux model 401 visibile light curing unit (Demetron, Danbury, Conn.; I=800 $mW/cm^2$). After each exposure time, the specimens were again scanned for their FTIR spectrum. The number of remaining double bonds was determined by a method described by Ruyter and Gyorosi (1976). Remaining unconverted double bonds were calculated by comparing the ratio of aliphatic C=C absorption at 1637 $cm^{-1}$ to the aromatic carbon-carbon stretching band at 1608 $cm^{-1}$. The aromatic band remains constant during the polymerization reaction and serves as an internal standard. The DC was determined by subtracting the percentage of residual aliphatic C=C bond from 100%(FIG. 1).

All experiments were carried out in triplicate, and the results were analyzed by analysis of variance followed by pairwise multiple comparisons using the Student-Newman-Keuls' multiple range comparison test, with p=0.05 as the level of significance.

To identify the light absorption range of each photosensitizer, the spectra of CQ and PPD were recorded with a UV/Vis spectrophotometer (Beckman DU-600, Beckman Coulter, Inc., Fullerton Calif.). Each photosensitizer was dissolved to concentrations of 10 mM in hexane. These spectra were compared with the spectral output distribution of the Optilux model 401 curing light used in the experiments (courtesy of Demetron Research Corp., Danbury, Conn.).

Comparison of the yellowness of resin samples containing combinations of the two photosensitizers was also undertaken. Resins with the same formulation used for degree of cure, were prepared with PPD/CQ (wt. %): 0.0/1.8, 1.8/0.0, 3.2/0.2, and 0.213.2. Specimens were placed in a PTFE mold (1.2 mm thick, 15 mm diameter) between two glass slides and cured for 60 seconds. Blind comparisons of the color of test specimens were carried out by three observers, having normal vision, by visual inspection in bright diffuse daylight. Samples were viewed against a white background for no longer than 2 seconds and rated according to the following scale; 0=no difference, 1=little perceptible difference, and 2=clearly perceptible difference. The color perception test was quantified using a calorimetric comparison, and carried out utilizing specimens of the same size and PPD/CQ concentrations, and measured with a color difference meter (Tokyo Denshoku TC-6FX, Japan).

FIG. 1 shows a characteristic FTIR spectrum of an experimental resin containing PPD photosensitizer (0.2 wt. % in monomer system) with 0.2 wt. % CEMA, before and after curing (8 minutes irradiation). By irradiation, the peak at 1637 $cm^{-1}$ caused by carbon-carbon double bond stretching is considerably reduced, demonstrating polymerization.

Tables II and III, below, contain the data for degree of conversion (+standard deviation) derived from these studies:

TABLE II

| Groups (PPD/CQ by wt. % in monomer system) | Curing Time (Seconds) | | | | | |
| --- | --- | --- | --- | --- | --- | --- |
|  | 20 | 40 | 60 | 120 | 240 | 480 |
| 0.0/0.2 | 46.77(1.06) | 50.25(3.42) | 51.76(1.18) | 55.96(2.63) | 55.53(0.54) | 58.14(0.97) |
| 0.2/0.2 | 49.74(1.12) | 54.38 | 66.84(2.04) | 58.74(2.87) | 80.96(2.18) | 60.81(2.98) |
| 0.4/0.2 | 52.10(1.79) | 55.72(2.05) | 57.99(1.24) | 58.44(1.87) | 69.82(0.43) | 61.24(0.94) |
| 0.8/0.2 | 52.1(1.05) | 56.70(1.01) | 58.69(0.85) | 60.06(1.13) | 53.34(0.78) | 63.81(1.47) |
| 1.6/0.2 | 54.70(0.85) | 67.47(1.45) | 58.84(1.35) | 80.77(0.86) | 61.35(1.09) | 63.68(1.02) |
| 3.2/0.2 | 57.85(1.03) | 61.30(1.33) | 52.96(0.77) | 65.69(1.60) | 56.07(0.96) | 68.67(0.70) |
| 0.2/0.0 | 41.28(5.92) | 47.42(4.36) | 48.54(2.40) | 51.63(3.43) | 53.42(3.57) | 55.72(3.36) |
| 0.2/0.2 | 49.74(1.12) | 54.38(1.92) | 55.94(2.04) | 58.74(2.87) | 60.95(2.18) | 60.61(2.98) |
| 0.2/0.4 | 52.66(1.78) | 57.74(2.61) | 69.21(2.17) | 58.53(2.51) | 62.01(2.58) | 62.37(2.38) |
| 0.2/0.8 | 55.57(0.58) | 57.92(1.17) | 60.01(0.71) | 61.69(1.38) | 62.63(0.68) | 63.24(2.07) |
| 0.2/1.6 | 57.83(1.03) | 60.73(0.33) | 62.45(0.84) | 63.65(1.13) | 64.35(1.07) | 65.02(0.89) |
| 02./3.2 | 54.59(1.38) | 58.58(1.01) | 59.52(0.82) | 61.63(1.18) | 82.60(0.84) | 63.28(0.65) |
| 0.1/0.1 | 41.77(2.70) | 51.16(3.34) | 53.80(1.00) | 54.31(0.41) | 64.95(2.43) | 57.34(0.86) |
| 0.0/0.2 | 46.77(1.06) | 50.26(3.42) | 51.76(1.18) | 55.96(2.88) | 55.53(0.64) | 58.14(0.97) |
| 0.2/0.0 | 41.28(5.92) | 47.42(4.36) | 48.54(2.40) | 51.53(3.43) | 53.42(3.37) | 55.72(3.38) |
| 0.2/0.2 | 49.74(1.12) | 54.38(1.92) | 55.94(2.04) | 58.74(2.87) | 60.95(2.18) | 60.81(2.98) |
| 0.0/0.4 | 51.33(0.86) | 54.43(0.44) | 55.92(1.07) | 58.60(2.38) | 58.11(1.51) | 58.71(1.30) |
| 0.4/0.0 | 50.48(1.03) | 54.54(1.37) | 56.15(1.48) | 58.28(1.24) | 59.50(0.81) | 60.53(0.85) |
| 0.0/1.8 | 53.13(1.14) | 56.13(1.54) | 58.29(0.89) | 59.38(0.43) | 60.10(0.67) | 61.43(0.45) |
| 1.8/0.0 | 50.96(0.97) | 55.15(1.45) | 68.03(2.23) | 59.80(0.51) | 61.42(1.55) | 61.45(0.82) |
| 1.6/0.2 | 54.70(0.85) | 57.47(1.46) | 59.84(1.35) | 60.77(0.86) | 63.35(1.09) | 63.66(1.02) |

TABLE II-continued

| Groups (PPD/CQ by wt. % in monomer system) | Curing Time (Seconds) | | | | | |
|---|---|---|---|---|---|---|
| | 20 | 40 | 60 | 120 | 240 | 480 |
| 0.2/1.6 | 57.83(1.04) | 60.73(0.33) | 62.45(0.94) | 63.55(1.13) | 64.35(1.07) | 65.02(0.89) |
| 0.9/0.9 | 50.92(0.52) | 58.19(1.16) | 61.48(0.60) | 63.64(0.63) | 64.81(0.23) | 65.34(0.45) |

TABLE III

| Groups (PPD/CQ by wt. %) | DC conversion (%) at 2 minute-cure mean ± SD |
|---|---|
| 3.2/0.2 | 65.89 ± 1.60$^a$ |
| 1.6/0.2 | 60.77 ± 0.86$^b$ |
| 0.8/0.2 | 60.08 ± 1.13$^a$ |
| 0.2/0.2 | 58.74 ± 2.87$^b$ |
| 0.4/0.2 | 58.44 ± 1.87$^b$ |
| 0.0/0.2 | 55.96 ± 2.83$^b$ |
| 0.2/1.6 | 63.55 ± 1.13$^a$ |
| 0.2/0.8 | 61.69 ± 1.38$^a$ |
| 0.2/3.2 | 61.63 ± 1.18$^a$ |
| 0.2/0.4 | 59.53 ± 2.51$^a$ |
| 0.2/0.2 | 58.74 ± 2.87$^a$ |
| 0.2/0.0 | 51.53 ± 3.43$^b$ |
| 0.9/0.9 | 63.64 ± 0.63$^a$ |
| 0.2/1.6 | 63.55 ± 1.13$^a$ |
| 1.6/0.2 | 60.77 ± 0.86$^b$ |
| 1.8/0.0 | 59.80 ± 0.61$^b$ |
| 0.0/1.8 | 59.38 ± 0.43$^b$ |
| 0.2/0.2 | 58.74 ± 2.87$^a$ |
| 0.4/0.0 | 58.28 ± 1.24$^a$ |
| 0.0/0.4 | 56.60 ± 2.36$^a$ |
| 0.0/0.2 | 55.96 ± 2.83$^a$ |
| 0.1/0.1 | 54.31 ± 0.41$^a$ |
| 0.2/0.0 | 51.53 ± 3.43$^a$ |

*Within each subgrouping, mean values designated with the same superscript letter are not statistically different (p < 0.05).

Figure 2A:
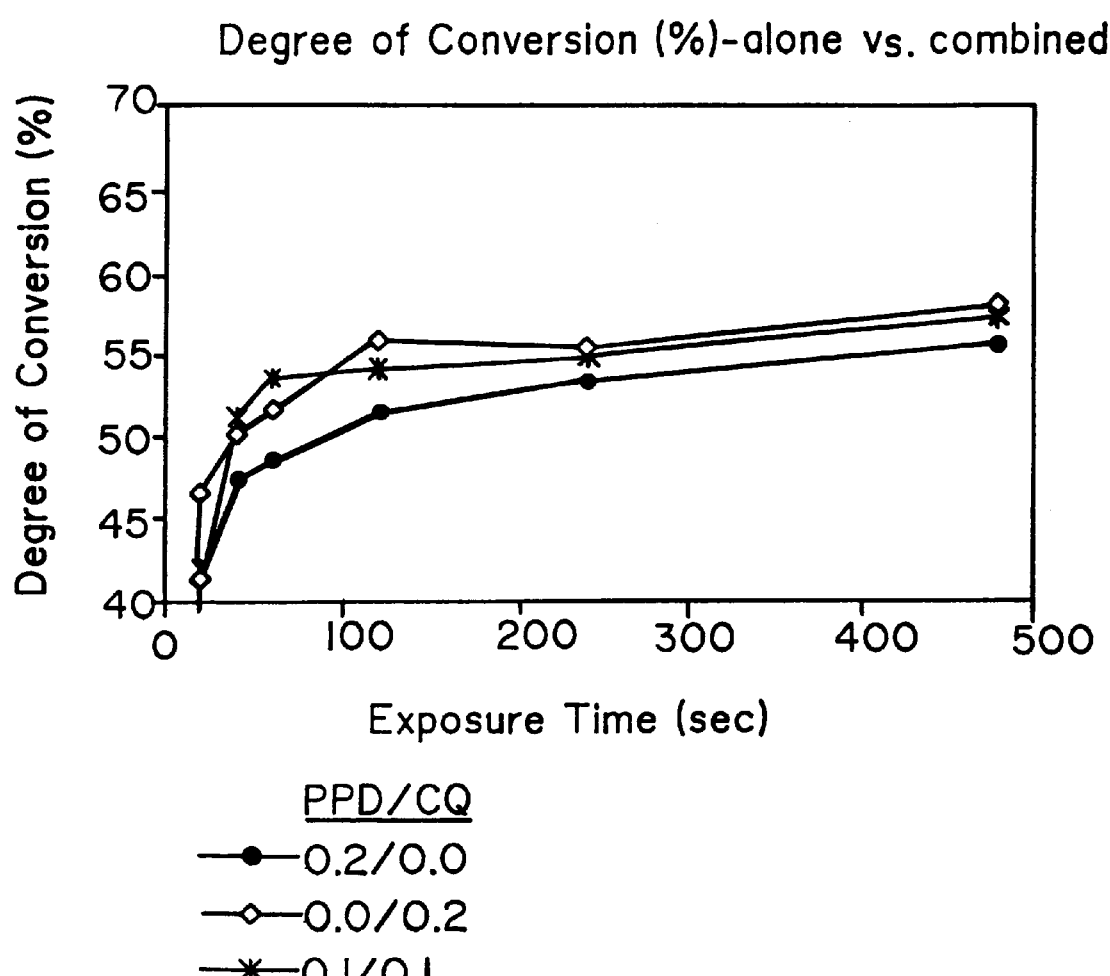
FIG. 2 depicts the degree of conversion (%) when the total photoinitiator concentration is 0.2 wt. % (A), 0.4 wt % (B), and 1.8 wt. % (C). At each total concentration, the DC can be seen for each photoinitiator used alone and in combination.
Figure 2B:
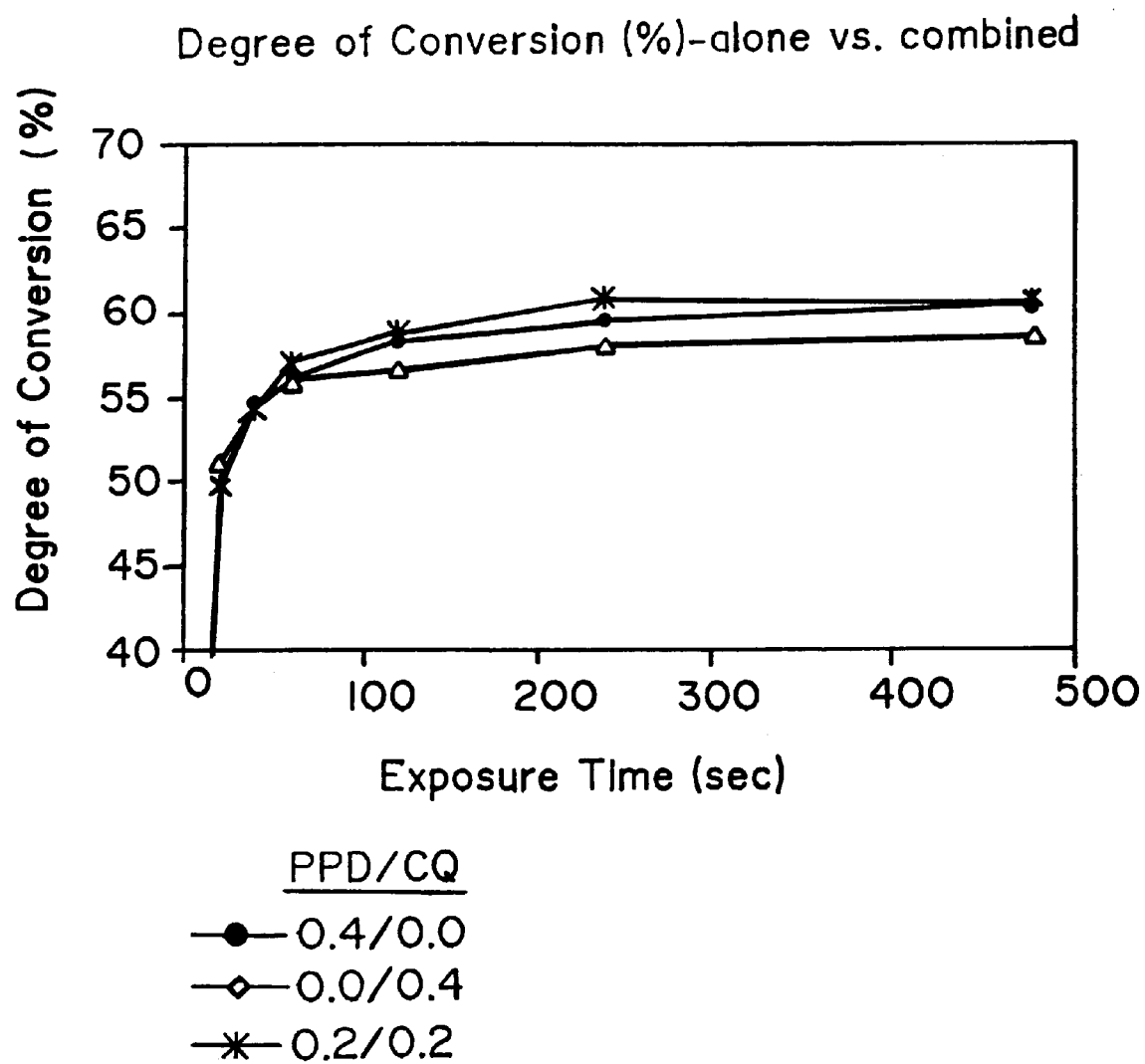
Figure 2C:
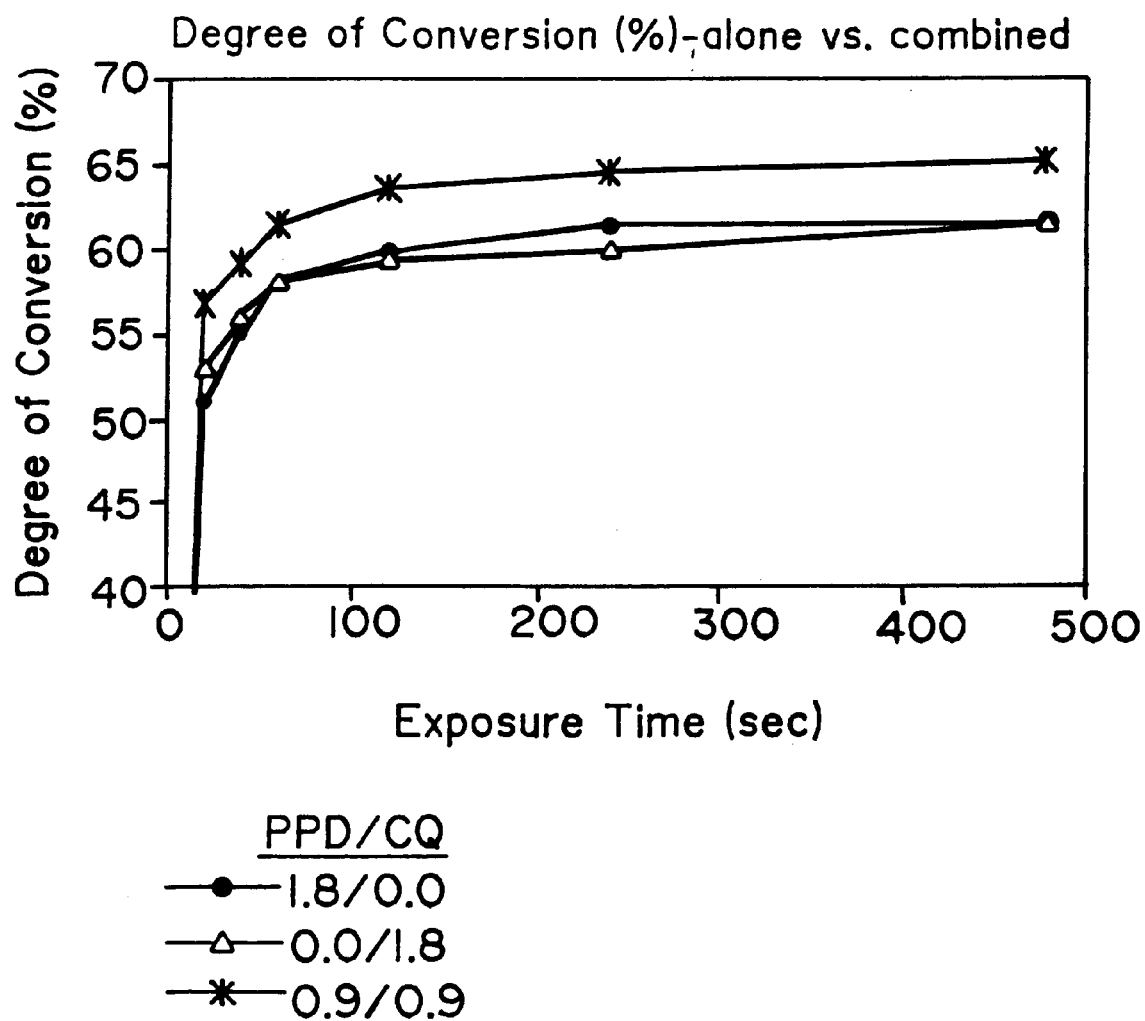

FIG. 2 shows the DC as a function of curing time when the total photosensitizer concentration was (A) 0.2 wt. %, (3) 0.4 wt. %, and (C) 1.8 wt. %. The DC for each photosensitizer, used either alone or in combination, is shown for each concentration. The DC increases with sensitizer concentration and levels out after about 60 seconds for all groups (p>0.05). Also, at each total concentration, the DC of the combination is either equal (See FIGS. 2-A and 2-B) to or greater than the DC for either CQ or PPD alone (p<0.05, see FIG. 2-C).

Figure 3A:
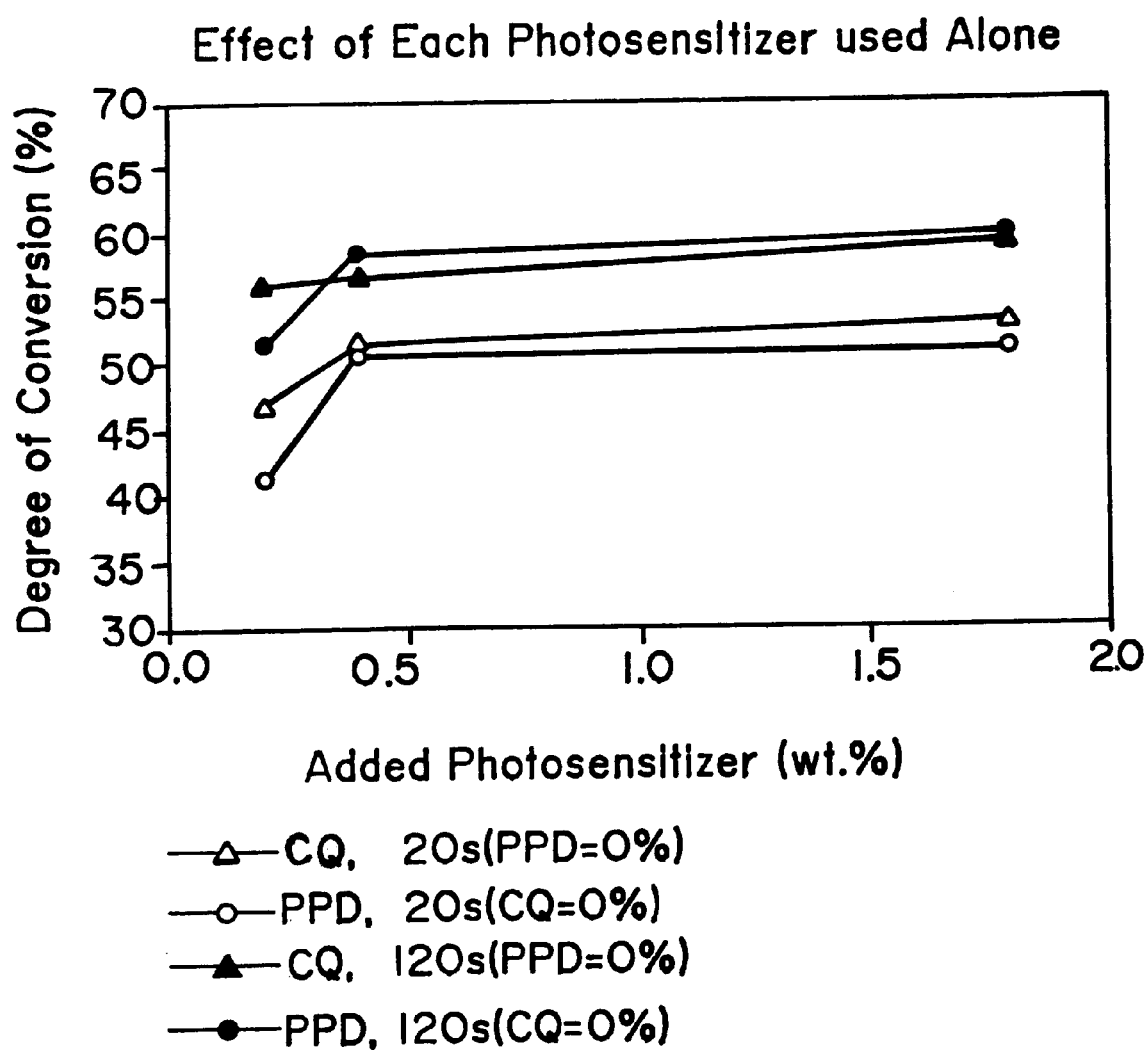
FIG. 3 depicts the degree of conversion (%) at 20 seconds and 120 seconds curing as the wt. % of initiator increases: (A) each photoinitiator used alone; (B) one initiator concentration is fixed at 0.2 wt. % and the other initiator varies from 0 wt. % to 3.2 wt. %.
Figure 3B:
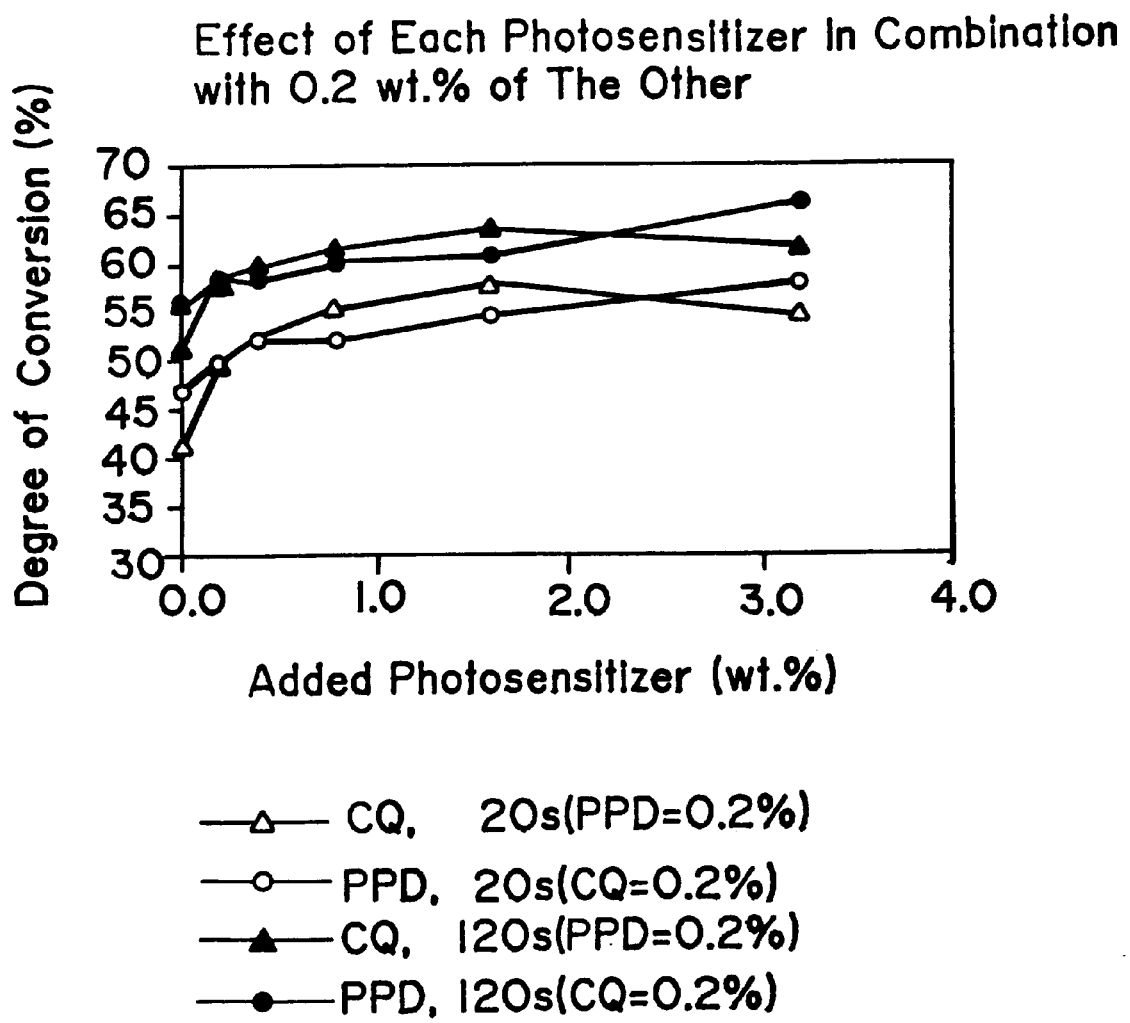

In FIG. 3, the DC is shown as a function of photosensitizer concentration, with each photosensitizer alone (see FIG. 3-A) or in combination with the other (see FIG. 3-B), holding the concentration of CEMA constant. For both CQ and PPD, the DC increases with concentration and plateaus at about 0.4 wt. % (see FIG. 3-A). CQ-containing resins tend to reach this plateau at somewhat lower concentrations than PPD-containing resins. This may be due to greater overlap of the CQ absorption band (380–510 nm) with the output of the curing lamp (see FIG. 5). PPD alone as photosensitizer induces a DC, at both short and long exposure times, which is not significantly different from CQ alone (see FIG. 3-A). The effect of combining two photosensitizers, CQ and PPD, in the presence of a set amount of amine reducing agent (0.2 wt. % CEMA) is shown in FIG. 3-B. Degree of cure increased rapidly with increasing concentration of the second photosensitizer and reached a plateau at about 60% conversion. This occurred at a ratio of approximately 4:1 (at total photosensitizer concentrations of 1.0 wt. %) for both PPD/CQ and CQ/PPD. At total concentrations above 1.5 wt. %, increasing PPD concentration increased DC, while increasing CQ concentration depressed DC. These trends were seen at both short (20 seconds) and long (2 minutes) exposure times.

Figure 4:
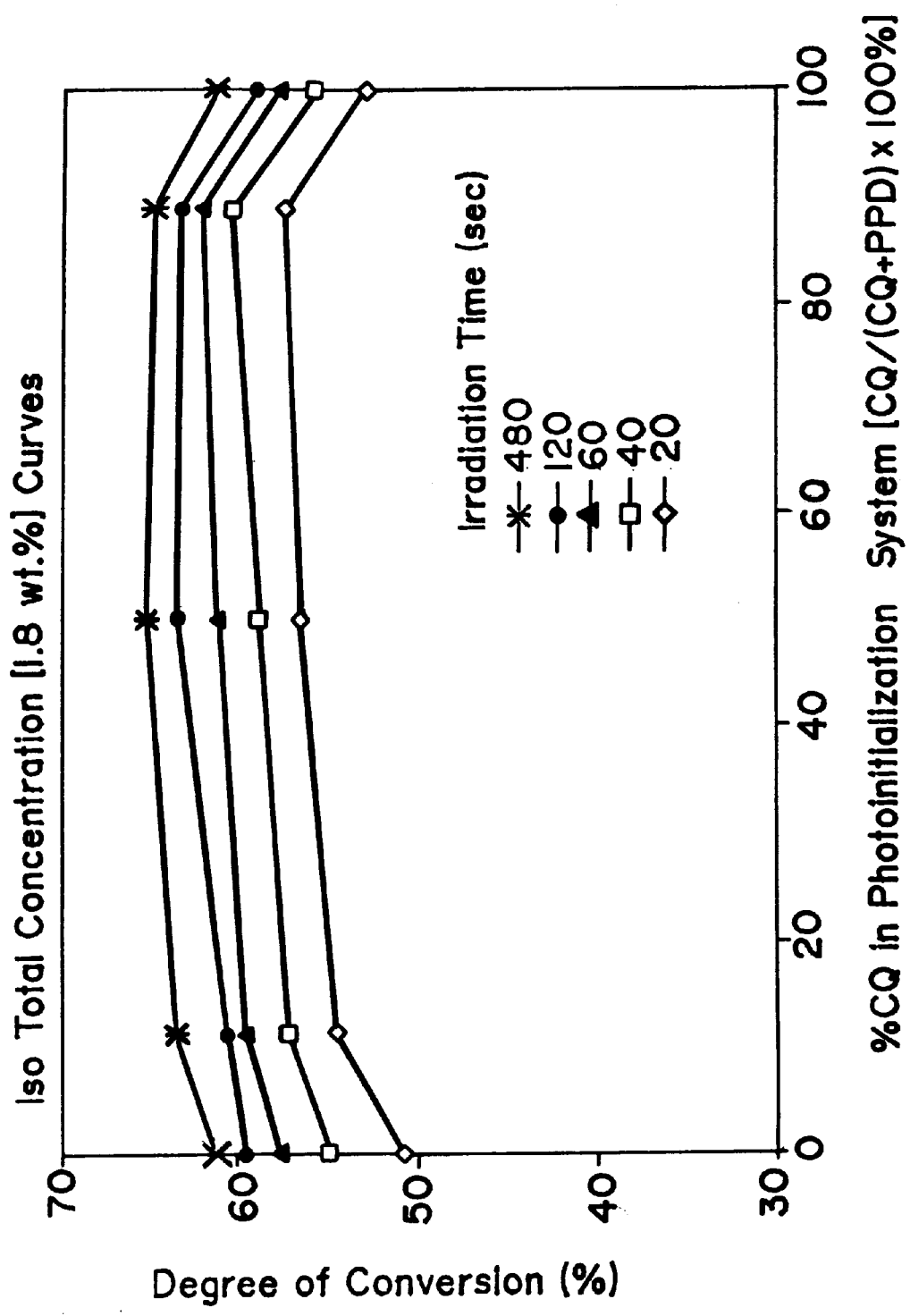
FIG. 4 depicts the degree of conversion (%) at different curing times as a function of % CQ in a CQ/PPD photoinitiation system. The total photosensitizer concentration is held at 1.8 wt. % in the monomer system.

FIG. 2 appears to show synergism, with the degree of conversion of CQ+PPD generally exceeding that for the same concentration of either alone. This result appears as a trend at photosensitizer concentrations of 0.2 and 0.4 wt. %, and is significant (p<0.05) at 1.8 wt. % (see FIG. 2-C). The synergistic effect is illustrated in FIG. 4, which shows the DC at different curing times as a function of CQ concentration in the total photosensitizer mixture. When CQ reached 89%, the highest DC values were attained at every exposure time. If the groups containing only PPD are compared to those having only CQ as photosensitizer, when the curing time is short (20 and 40 seconds), CQ produces a higher DC than PPD. However, as the curing time increases beyond 60 seconds, PPD produces higher DC values than CQ (see FIGS. 2-B, 2-C, and 4).

Figure 5:
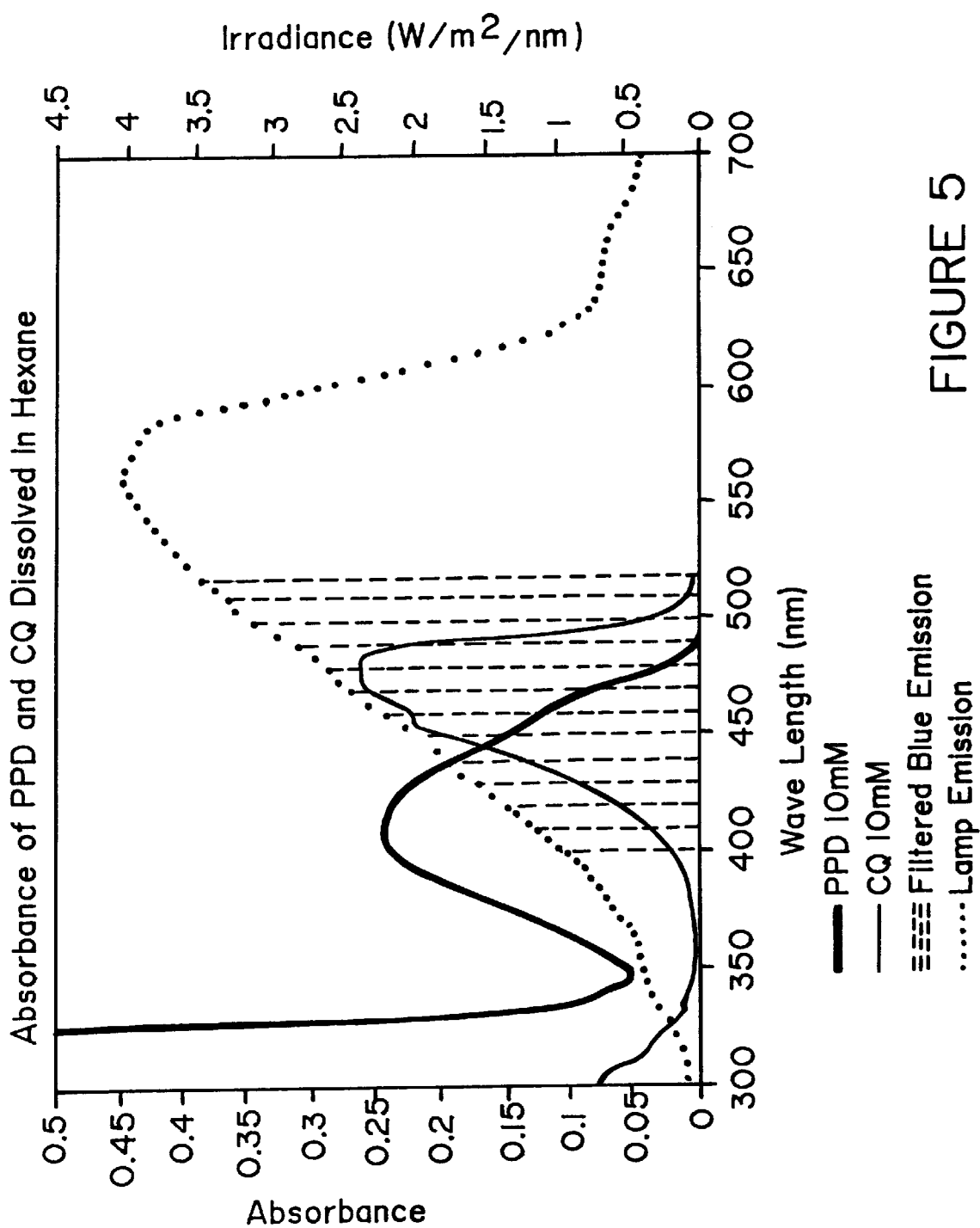
FIG. 5 depicts absorbance of 10 millmolar (mM) solutions of CQ and PPD in hexane, and the spectral radiant flux (W/m$^2$/nm) emitted by a Demetron 80 Watt blue lamp (the spectral emission between the two vertical lines is the result of filtering by UV & thermal filters).

FIG. 5 shows the spectral radiant flux (W/cm$^2$/nm) emitted by the Demetron 80 Watt lamp. The filtered region, used for curing, is indicated and the visible absorption spectra of 10 in solutions of CQ and PPD in hexane are also shown.

Figure 6:
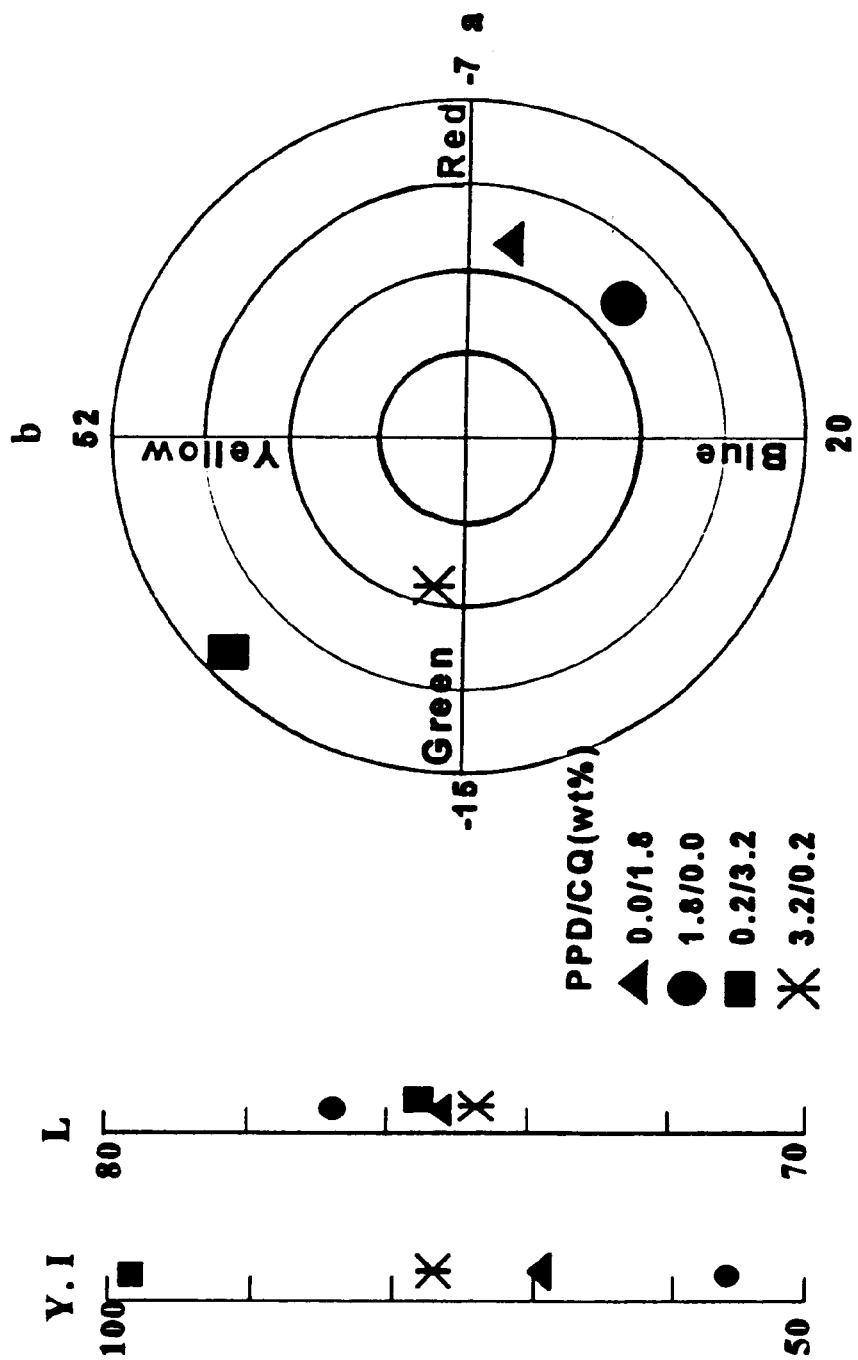
FIG. 6 depicts a graphical illustration of the color change induced in resin photocured using CQ, PPD, and mixed CQ/PPD photosensitizers.

The color perception results demonstrated that samples with high PPD levels (PPD/CQ=1.8/0.0 and 3.2/0.2) have perceptibly less depth of yellowness (difference rating=2) than the samples with high CQ levels (PPD/CQ=0.0/1.8 and 0.2,3.2), respectively. The colorimetric comparison confirmed the color perception results, demonstrating that substituting PPD for CQ results in approximately a 20% reduction in the Yellowness Index over a wide range of concentrations of photosensitizer. These results are shown in Table IV (below) which contains a quantitative color comparison of resins photocured with mixtures of CQ and PPD, and graphically illustrated in FIG. 6.

TABLE IV

| PPD/CQ Concentration (wt/% in Monomer System) | Yellowness Index | L* | a* | b* | ΔE |
|---|---|---|---|---|---|
| 0.0/1.8 | 69.67 (0.74) | 75.33 (0.22) | −8.83 (0.61) | 32.76 (0.51) | 4.9943 |
| 1.8/0.0 | 56.68 (0.31) | 76.71 (0.07) | −9.2 (0.05) | 28.01 (0.17) | |
| 0.2/3.2 | 98.75 (0.23) | 75.38 (0.19) | −13.73 (0.11) | 46.99 (0.05) | 9.5727 |
| 3.2/0.2 | 77.52 (0.10) | 74.75 (0.15) | −12.95 (0.18) | 37.47 (0.10) | |

Hunter L*a*b* Yellowness Index (Y.I.)

The results show that PPD serves as an efficient visible light photosentitizer comparable to camphorquinone for initiation of dental resin polymerization (see FIGS. 1–4). Moreover, PPD and CQ act synergistically as photosensitizers (see FIGS. 2–4). First, PPD and CQ probably have different mechanisms of free radical formation. While CQ operates predominantly by proton abstraction by ketone (analogous to benzil (Ar—C(O)—C—Ar)), PPD, in analogy with benzoin (Ar—C(O)—C(OH)—Ar), can undergo both photocleavage and proton abstraction. Second, the combination of PPD and CQ absorb more of the available photon energy, due to absorbing over slightly different wavelength ranges (see FIG. 5). The more efficient utilization of photon energy will either reduce the required curing time and/or decrease the remaining unreacted groups. This blend of photosensitizers may also produce a better balance between surface cure and bulk cure.

An interesting effect is observed at the higher concentrations of CQ and PPD, when the amine reducing agent is kept constant FIG. 3). DC is increased at higher PPD concentrations but is decreased at higher CQ concentrations (20 seconds and two minutes exposure times). This may be related to the different mechanisms utilized by PPD and CQ. While CQ is most efficient when it is able to form an exciplex (excited complex) with an electron donator, PPD is most efficient forming free radicals by the photocleavage route, which is independent of amine concentration. Thus, when the surplus of CQ is too high, not all excited molecules will find an amine to form an exciplex and many will return unreacted to the ground state. The samples will remain yellow from the excess of CQ, the excitation light source will be more strongly attenuated and free radical formation will be reduced. Another mechanism available to PPD may be additional polymerization via its ability to undergo keto-enol tautomeric transformations. Diketones may exist in the enol form to an appreciable extent, and also can participate in the crosslinking reactions and increase the DC at higher PPD concentrations.

From FIG. 5 it would be expected that reducing the CQ ($Lambda_{max}$=about 410 nm) shifts the hue to a less yellow shade, as verified by both a visual color comparison and a colorimetric test. The combination will also contribute to a reduction in chroma (from deep yellow to a pale yellow) when the total photosensitizer PPD & CQ) concentration is held constant. Because CQ is yellow, a limit to its concentration is imposed by aesthetic considerations (Taira et al., 1988). Thus, using PPD in combination with CQ will expand the practical limit of photosensitizer concentration. For a given DC, lower total concentration of photosensitizer is required. At any concentration, DC will be increased but more of the light will be absorbed close to the surface (Guthrie et al., 1986; Gatechari and Tiefenthaler, 1989). Therefore, from the standpoint of esthetics and depth of cure in deep restorations, after finding the PPD/CQ ratio for maximum DC in film samples, evaluating the DC by changing the total photoinitiator concentration is needed. Further, by matching the spectral distribution of the visible light curing unit to the absorption spectrum of the combined photosensitizers, enhanced photopolymerization should be achieved efficiently (Cook, 1982).

Further studies show that 1-phenyl-1,2-propanedione itself is a photosensitizer of potential value as a less off-color sensitizer for visible light cured dental resins. Moreover, there is a synergism effect between CQ and PPD. This feature may be taken advantage of by optimizing the PD/CQ system for maximum efficiency resulting in both aesthetic and functional property advantages. Further investigation of the structure/property relationship of PPD-like compounds, and their effect in combination with CQ and other potential sensitizers, has potential for further improvements in photoinitiator efficiency.

The foregoing description is given for clearness of understanding only, and no unnecessary limitations should be understood therefrom, as modifications within the scope of the invention may be apparent to those having ordinary skill in the art.

What is claimed is:

1. A composition for use in forming photocured dental composites, the composition comprising a mixture of:
   (a) a 1-aryl-2-alkyl-1,2-ethanedione; and,
   (b) a rigid 1,2-dione,
   in a weight ratio of (a):(b) in a range of about 1:20 to about 20:1.

2. The composition of claim 1, wherein the weight ratio of (a):(b) is about 1:16 to about 16:1.

3. The composition of claim 1, wherein the weight ratio of (a):(b) is about 1:8 to 8: 1.

4. The composition of claim 1, wherein the 1-aryl-2-alkyl-1,2-ethanedione is 1-phenyl-1,2-propanedione and the rigid 1,2-dione is camphorquinone.

5. A photocurable dental composition comprising:
   (a) a mixture of
      (i) a 1-aryl-2-alkyl-1,2-ethanedione; and,
      (ii) a rigid 1,2-dione,
   in a weight ratio of(i):(ii) in a range of about 1:20 to about 20:1; and,
   (b) at least one photopolymerizable monomer,
   wherein the mixture is present in an amount sufficient to achieve a degree of double-bond conversion of at least 50%.

6. The composition of claim 5, wherein the weight ratio of (i):(ii) is about 1:16 to 16:1.

7. The composition of claim 5, wherein the weight ratio of (i):(ii) is 1:18 to 18:1.

8. The composition of claim 5, wherein the 1-aryl-2-alkyl-1,2-ethanedione is 1-phenyl-1,2-propanedione and the rigid 1,2-dione is camphorquinone.

9. The composition of claim 5, wherein the photopolymerizable monomer is a diacrylate, a triacrylate, or a mixture thereof.

10. The composition of claim 9, wherein the diacrylate is selected from the group consisting of 2,2-Bis-[4-(2-hydroxy-3-mathacryloxy-propyloxy)phenyl]propane, 2,2-Bis-[4-(2-ethoxy-3-mathacryloxy-propyloxy)phenyl]propane, urethane dimethacrylate, triethyleneglycol dimethacrylate, ethylene glycol dimethacrylate, and mixtures thereof.

11. The composition of claim 9, wherein the triacrylate is selected from the group consisting of trimethylolpropane triacrylate, trimethylolpropane trimethacrylate, and mixtures thereof.

12. The composition of claim 5, further comprising:
   (c) a reducing agent.

13. The composition of claim 12, wherein the reducing agent (c) is a dialkylarylamine, a tertiaryalkylamine, or a mixture thereof.

14. The composition of claim 13, wherein the dialkylarylamine is selected from the group consisting of N,N-cyanoethylmethylaniline, N,N-dimethyl-paratoluidene, and mixtures thereof.

15. The composition of claim 13, wherein the tertiary-alkylamine is selected from the group consisting of N,N-dimethylamino ethylmethacrylate, N,N-diethylamino ethylmethacrylate, and mixtures thereof.

16. The composition of claim 5, wherein the degree of conversion is at least 55%.

17. The composition of claim 16, wherein the degree of conversion is at least 60%.

18. A method of making a composition for use in forming photocured dental composites, the method comprising the step of combining at least one photopolymerizable monomer with a photoinitiator system comprising a mixture of (a) a 1-aryl-2-alkyl-1,2-ethanedione and (b) a rigid 1,2-dione in a weight ratio of(a):(b) in a range of about 1:20 to about 20:1, the mixture being present in an amount sufficient to achieve a degree of double-bond conversion of at least 50%.

19. The method of claim 18, wherein the weight ratio of (a):(b) is about 1:16 to 16:1.

20. The method of claim 18, wherein the weight ratio of (a):(b) is about 1:8 to 8:1.

21. The method of claim 18, wherein the 1-aryl-2-alkyl-1,2-ethanedione is 1-phenyl-1,2-propanedione and the rigid 1,2-dione is camphorquinone.

22. The method of claim 18, wherein the photopolymerizable monomer is a diacrylate, a triacrylate, or a mixture thereof.

23. The method of claim 22, wherein the diacrylate is selected from the group consisting of 2,2-Bis-[4-(2-hydroxy-3-mathacryloxy-propyloxy)phenyl]propane, 2,2-Bis-[4-(2-ethoxy-3-mathacryloxy-propyloxy)phenyl]propane, urethane dimethacrylate, triethyleneglycol dimethacrylate, ethylene glycol dimethacrylate, and mixtures thereof.

24. The method of claim 22 wherein the triacrylate is selected from the group consisting of trimethylolpropane triacrylate, trimethylolpropane trimethacrylate, and mixtures thereof.

25. The method of claim 18, wherein the composition further comprises a reducing agent.

26. The method of claim 25, wherein the reducing agent is a dialkylarylamine, a tertiaryalkylamine, or a mixture thereof.

27. The composition of claim 26, wherein the dialkylarylamine is selected from the group consisting of N,N-cyanoethylmethylamine, N,N-dimethyl-paratoluidene, and mixtures thereof.

28. The composition of claim 26, wherein the tertiaryalkylamine is selected from the group consisting of N,N-dimethylamino ethylmethacrylate, N,N-diethylamino ethylmethacrylate, and mixtures thereof.

29. The method of claim 18, wherein the degree of conversion is at least 55%.

30. The method of claim 29, wherein the degree of conversion is at least 60%.

* * * * *